US 010813143B2

(12) United States Patent
Lei et al.

(10) Patent No.: US 10,813,143 B2
(45) Date of Patent: Oct. 20, 2020

(54) MULTIPLE EVENT-BASED VEHICLE COMMUNICATIONS

(71) Applicant: Ford Global Technologies, Inc., Dearborn, MI (US)

(72) Inventors: Oliver Lei, Windsor (CA); Allen R. Murray, Lake Orion, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 22 days.

(21) Appl. No.: 15/808,305

(22) Filed: Nov. 9, 2017

(65) Prior Publication Data
US 2019/0141756 A1    May 9, 2019

(51) Int. Cl.
| | |
|---|---|
| G06F 15/16 | (2006.01) |
| H04W 76/10 | (2018.01) |
| H04L 29/06 | (2006.01) |
| H04L 29/08 | (2006.01) |
| H04W 4/40 | (2018.01) |
| H04W 4/90 | (2018.01) |
| H04W 4/80 | (2018.01) |
| H04W 4/02 | (2018.01) |

(52) U.S. Cl.
CPC ........... *H04W 76/10* (2018.02); *H04L 67/125* (2013.01); *H04L 67/18* (2013.01); *H04L 67/34* (2013.01); *H04L 69/18* (2013.01); *H04W 4/40* (2018.02); *H04W 4/02* (2013.01); *H04W 4/80* (2018.02); *H04W 4/90* (2018.02)

(58) Field of Classification Search
CPC .... H04W 76/00; H04W 4/046; H04L 67/125; H04L 67/34

USPC ........................................................ 709/227
See application file for complete search history.

(56) References Cited

U.S. PATENT DOCUMENTS

| | | | |
|---|---|---|---|
| 8,576,901 B2* | 11/2013 | Tat ........................ | H04W 88/06 341/173 |
| 8,903,354 B2 | 12/2014 | Hatton | |
| 2002/0106059 A1 | 8/2002 | Kroll | |
| 2006/0158329 A1* | 7/2006 | Burkley ................ | H04W 4/024 340/539.13 |
| 2012/0220258 A1 | 8/2012 | Hatton | |
| 2012/0258683 A1 | 10/2012 | Staehlin | |
| 2012/0289185 A1 | 11/2012 | Leung | |
| 2013/0109404 A1 | 5/2013 | Husney | |
| 2013/0130639 A1 | 5/2013 | Oesterling et al. | |

(Continued)

FOREIGN PATENT DOCUMENTS

| | | |
|---|---|---|
| CN | 103529818 A | 1/2014 |
| CN | 103973765 A | 8/2014 |

(Continued)

*Primary Examiner* — Alan S Chou
(74) *Attorney, Agent, or Firm* — Michael Spenner; Brooks Kushman PC

(57) ABSTRACT

Systems and methods for generating multiple vehicle communications in response to an event include a vehicle having a first embedded modem, a second embedded modem, and a processor. The processor is configured to identify occurrence of a predetermined event. Responsive to occurrence of the predetermined event, the processor is configured to wirelessly transmit a vehicle location offboard the vehicle via a voice call established by the first embedded modem and via a data call established by the second embedded modem for a remote monitoring service.

18 Claims, 3 Drawing Sheets

(56) References Cited

U.S. PATENT DOCUMENTS

| | | | |
|---|---|---|---|
| 2013/0226369 A1 | 8/2013 | Yorio et al. | |
| 2014/0087680 A1 | 3/2014 | Luukkala et al. | |
| 2015/0111517 A1 | 4/2015 | Kowalewski | |
| 2015/0342542 A1 | 12/2015 | An | |
| 2015/0348337 A1* | 12/2015 | Choi | G07C 5/08 |
| | | | 701/31.5 |
| 2016/0007384 A1 | 1/2016 | Dettloff | |
| 2016/0029197 A1 | 1/2016 | Gellens | |
| 2016/0087655 A1 | 3/2016 | Kim | |
| 2017/0067747 A1* | 3/2017 | Ricci | H04W 4/21 |
| 2017/0135136 A1* | 5/2017 | Lei | H04M 1/7253 |
| 2018/0192277 A1* | 7/2018 | Corley | H04W 4/90 |
| 2019/0069127 A1* | 2/2019 | Marko | H04W 4/02 |

FOREIGN PATENT DOCUMENTS

| | | |
|---|---|---|
| CN | 104050831 A | 9/2014 |
| CN | 104554080 A | 4/2015 |

* cited by examiner

MULTIPLE EVENT-BASED VEHICLE COMMUNICATIONS

Aspects of this disclosure generally relate to transmitting multiple communications from a vehicle responsive to a vehicle-related event.

BACKGROUND

Vehicles are often equipped with wireless communications technology for enabling the provision of remote services. A need exists to increase the likelihood that information transmitted offboard a vehicle is received by an intended recipient, especially in situations involving safety.

SUMMARY

In an exemplary embodiment, a system includes a vehicle having an embedded first modem and an embedded second modem. The vehicle also includes a process configured to identify occurrence of a predetermined event. Responsive to occurrence of the predetermined event, the processor is configured to wirelessly transmit a vehicle location offboard the vehicle via a voice call established by the first modem and via a data call established by the second modem for a remote monitoring service.

In a further exemplary embodiment, a vehicle includes a first embedded modem configured to receive remote control commands for the vehicle, and a second embedded modem configured to receive software updates for the vehicle. The vehicle also includes a processor configured to identify occurrence of a predetermined event. Responsive to occurrence of the predetermined event, the processor is configured to wirelessly transmit a vehicle location offboard the vehicle via the first modem and via the second modem for a remote monitoring service.

In another exemplary embodiment, a method includes, responsive to occurrence of a predetermined event, wirelessly transmitting, by a vehicle, a vehicle location offboard the vehicle via a first text message to a remote monitoring service and via a second text message to a server geographically remote from the remote monitoring service. Responsive to receiving the vehicle location, the server is configured to transmit the vehicle location to the remote monitoring service.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; and some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
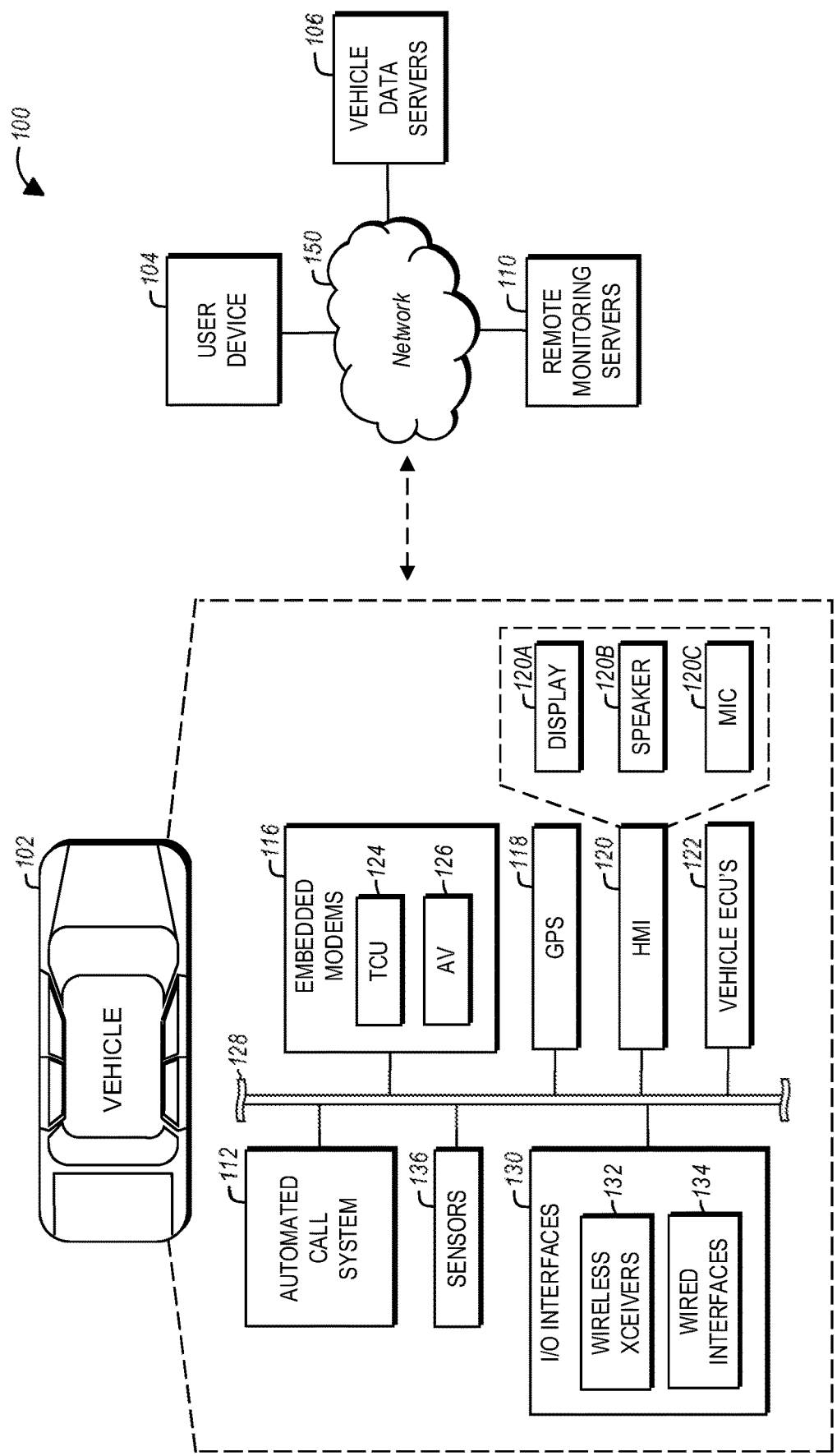
FIG. 1 is a schematic diagram of an exemplary system for transmitting multiple communications from a vehicle.

FIG. 1 illustrates a system 100 for automatically transmitting multiple communications from a vehicle responsive to a predetermined event. As shown in the illustrated embodiment, the system 100 may include several components, such as a vehicle 102, a user device 104, one or more vehicle data servers 106, and one or more remote monitoring servers 110. Each of these system 100 components may be geographically remote from one another, and each may communicate with one or more of the other system 100 components over a network 150. The network 150 may include one or more interconnected communication networks. For example, the network 150 may include one or more of the Internet, a cable television distribution network, a satellite link network, a local area network, a wide area network, and/or a telephone network.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). The vehicle 102 may also be an autonomous vehicle (AV). As the type and configuration of the vehicle 102 may vary, the capabilities of the vehicle 102 may correspondingly vary. For title, inventory, and other purposes, the vehicle 102 may be associated with and include thereon a unique identifier, such as a vehicle identification number ("VIN").

The vehicle 102 may include several components, such as an automated call system 112, configured to perform functions in support of the processes described herein. For example, the automated call system 112 may be configured to, responsive to occurrence of a predetermined event (e.g., accident, vehicle 102 malfunction, user selection of an emergency button, security breach), automatically cause the vehicle 102 to wirelessly transmit multiple communications offboard the vehicle for one of the remote monitoring servers 110.

The automated call system 112 may be configured to communicate with other vehicle 102 components via one or more in-vehicle networks 128. The in-vehicle networks 128 may include one or more of a vehicle controller area network ("CAN"), an Ethernet network, and a media oriented system transfer ("MOST"). The other vehicle 102 components may include embedded modems 116, a global positioning system ("GPS") module 118, a human machine interface ("HMI") 120, various electronic control units ("ECU's") 122, event sensors 136, and/or input/output ("I/O") interfaces 130.

The vehicle ECU's 122 may be configured to monitor and manage various functions of the vehicle 102 under the power of the vehicle 102 battery and/or drivetrain. The vehicle ECU's 122 may include, but are not limited to, a powertrain controller configured to manage engine operating components, a body controller configured to manage various power control functions such as exterior lighting, interior lighting, keyless entry, remote start, and point of access status verification, a radio transceiver controller configured to communicate with key fobs, mobile devices, or other local vehicle 102 devices, an entertainment controller configured to support voice command and Bluetooth interfaces with the driver and driver carry-on devices, and a climate management controller configured to monitor and manage heating and cooling system components (e.g., compressor clutch, blower fan, temperature sensors, etc.).

The GPS module 118 may be configured to identify vehicle location information, such as via communicating with satellites. The vehicle location information may include a current latitude and longitude of the vehicle 102. The GPS module 118 may be configured to provide this information to another vehicle 102 component, such as the automated call system 112.

The HMI 120 may facilitate occupant interaction with the vehicle 102, or more particularly, with the aforementioned vehicle 102 components. The HMI 120 may receive input from and output information to a user. The HMI 120 may include input devices and controls such as a touch screen display 120A, an alphanumeric keyboard, a pointing device, keypads, pushbuttons, control knobs, and microphones 120C capable of accepting commands or input from the user to invoke functions of the vehicle 102 components. For example, the HMI 120 may include steering wheel audio buttons, a push-to-talk button, instrument panel controls, and the like. The HMI 120 may also include video or alphanumeric displays 120A, one or more speaker 120B, and any other suitable audio and visual indicators capable of providing data to the user. For example, the HMI 120 may include a head unit display 120A included in a center console area of the vehicle 102 cabin and/or a screen 120A of a gauge cluster of the vehicle 102.

The embedded modems 116 may facilitate communication between the vehicle 102 other system 100 components over the network 150. Each embedded modem 116 may be a cellular modem configured to connect to the network 150 over a cellular network, and may thereby facilitate the exchange of data between the vehicle 102 and the other system 100 components. Because the embedded modems 116 are integrated with the vehicle 102, and because the embedded modems 116 may be directly connected to the one or more in-vehicle networks 128, the embedded modems 116 enable a faster and more reliable connection to the network 150 for the vehicle 102 relative to non-embedded modems, such as that of a user's mobile phone, that may be only periodically connected to the vehicle 102 when the vehicle 102 is on over a less-reliable, slower, and/or wireless connection. In other words, the vehicle 102 components, such as the automated call system 112, may interact with the embedded modems 116 to communicate with the network 150 when the vehicle 102 is turned off, and may interact with the embedded modems 116 to communicate with the network 150 without having to go over a less-reliable, slower, and/or wireless connection between the vehicle 102 components and a non-embedded modem.

Different embedded modems 116 may support different remote services for the vehicle 102. As shown in the illustrated embodiment, the embedded modems 116 may include a telematics control unit ("TCU") modem 124 and an autonomous vehicle ("AV") modem 126. The TCU modem 124 may support receiving and processing remote control commands for the vehicle 102. For example, a user may wirelessly transmit a remote lock command, a remote unlock command, or a remote start command for the vehicle 102 from his or her user device 104 over the network 150. The user device 104 may be configured to transmit such commands to the TCU modem 124 over the network 150, either directly or via a vehicle data server 106. Responsive to receiving the command, the TCU modem 124 may be configured to facilitate processing of the command, such as by interpreting the command and forwarding the command to the appropriate vehicle ECU 122. For example, responsive to receiving a remote start command, the TCU modem 124 may be configured to forward a corresponding signal to the vehicle ECU's 122, or more particularly, to the powertrain controller, to start the vehicle 102 engine.

The AV modem 126 may support receiving software updates and navigation system updates (e.g., map updates) for the vehicle 102, or more particularly the vehicle 102 ECU's, from the vehicle data servers 106 over the network 150 and/or may support uploading images and videos captured by a vehicle 102 camera to the vehicle data servers 106 over the network 150. Such data may facilitate driving operation of the vehicle 102 when the vehicle 102 is an autonomous vehicle. Because the AV modem 126 may be configured for receiving and transmitting large data files relative to the data received at the TCU modem 124, the AV modem 126 may be configured to communicate at higher speeds and higher bandwidths than the TCU modem 124, such as by being subscribed to a high-speed data only cellular plan.

In some embodiments, different embedded modems 116 may be configured for different communication services, such as based on the function of the embedded modem 116. For example, each of the embedded modems 116 may be configured for one or more of wireless data service, wireless voice service, and wireless text messaging service. A wireless voice service may enable a subscribing modem 116 to establish voice call with another device over a cellular voice network of a cellular provider, a wireless text service may enable a subscribing modem 116 to transmit text messages to another device over a control or traffic channel of a cellular provider, and a wireless data service may enable a subscribing modem 116 to establish a data call that provides access to the Internet and communication with other devices over the Internet, and to establish a voice call over the Internet, such as via a voice over data protocol (e.g., Voice Over Internet Protocol, Voice Over LTE), over a cellular data network of a cellular provider. In the case of wireless voice service, establishing a voice call may entail the subscribed embedded modem 116 dialing a phone number of the other device to establish a circuit-switched connection wither the other device over a cellular voice network. In the case of wireless data service, establishing a voice call or a data call may entail the subscribed embedded modem 116 connecting to the cellular data network (if a connection is not already established), establishing a session with the cellular data network, and/or establishing a TCP/IP session with the destination device to form a packet-switched connection with the other device over a cellular data network. Any of the modems 116 configured to establish voice calls may further be configured to transmit audio received via the microphone 120C, such as from a driver or passenger, over the voice call, and transmit audio received from the voice call to the speaker 120B, so as to facilitate real-time telephone calls by a driver or passenger, such as with a person at the remote-monitoring service operating the remote monitoring server 110

In the illustrated embodiment, the AV modem 126, which may transmit and receive large data files, may be configured for a high-speed wireless data service and not wireless voice service or wireless text service. The TCU modem 124, which may transmit and receive remote control commands having a small data size relative to the files transmitted and received by the AV modem 126, may be configured for wireless voice service, wireless text service, and wireless data service. For example, a remote control command may be transmitted to the TCU modem 124 in packets sent over a data call established via the wireless data service, in a text message sent via the wireless text service, or embodied in dual-tone multi-frequency ("DTMF") tones sent over a voice call established via the wireless voice service or wireless data service of the TCU modem 124.

Figure 2:
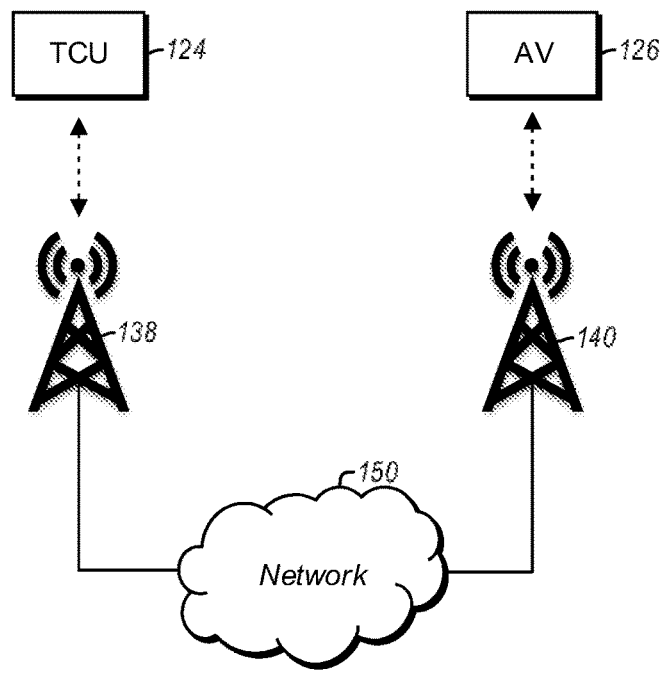
FIG. 2 is a schematic diagram of exemplary communication paths between a vehicle and a network.

In some embodiments, different embedded modems 116 may be configured to communicate via cellular networks of different cellular network providers. For example, referring to FIG. 2, the TCU modem 124 may be configured to communicate with the network 150 via cellular tower 138 of one cellular network provider, and the AV modem 126 may be configured to communicate with the network 150 via a cellular tower 140 of another cellular network provider. Different cellular network providers may provide different levels of coverage at a given location. Consequently, when the vehicle 102 is in a location where cellular coverage for one of the embedded modems 116 is poor or non-existent, the vehicle 102 may still communicate with the network 150 via another one of the embedded modems 116 that has better cellular coverage.

Referring again to FIG. 1, the I/O interfaces 130 may provide one or more machine interfaces that operatively couple the vehicle 102 to other systems and devices, such as a user device 104. In some embodiments, an I/O interface 130 may be specific to connecting the vehicle 102 to systems and devices local to (e.g., near or around) the vehicle 102. The I/O interfaces 130 may include one or more wireless transceivers 132 (e.g., Bluetooth transceiver, Wi-Fi transceiver, ZIGBEE transceiver) for connecting and communicating with wireless transceivers of other devices systems, such as those that are local to the vehicle 102. The I/O interfaces 130 may also include one or more wired interfaces 134 (e.g., Ethernet interface, universal serial bus ("USB") interface) for connecting and communicating with wired interfaces of other devices and systems, such as those that are local to the vehicle 102. In some embodiments, the vehicle 102 may communicate with the network 150 via the I/O interfaces 130 and another system 100 component. For example, a user device 104 may be a mobile phone, and the vehicle 102 may connect to the mobile phone via the Bluetooth transceiver or USB interface for hands-free phone service, music sharing, and/or access to the network 150 over the mobile phone's cellular connection.

The event sensors 136 may be configured to, upon occurrence of a predetermined event, generate a signal indicative of the event, which may be received by the automated call system 112. In some embodiments, the event sensors 114 may be configured generate an event signal when the vehicle 102 is involved in an accident. For example, the event sensors 114 may include impact sensors arranged around the vehicle 102, and may be configured to generate a signal indicative of an accident when the vehicle 102 experiences an impact having a force beyond a predetermined level. In some embodiments, the event sensors 136 may include the same sensors that determine whether an airbag should be deployed in the vehicle 102. As a further example, the event sensors 136 may include airbag deployment sensors configured to generate an event signal when an airbag is deployed.

The event sensors 136 may also include a user-selectable button that, upon selection by a user, causes the automated call system 112 to receive an event signal indicative of a user-initiated emergency. As another example, the event sensors 136 may include one or more glass breakage sensors that, upon breakage of a window, causes the automated call system 112 to receive a corresponding signal. The event sensors 136 may further include malfunction sensors that, upon vehicle 102 malfunction (e.g., an engine malfunction), causes the automated call systems 112 to receive an event signal.

During operation of the vehicle 102, responsive to a predetermined event such as an accident, the automated call system 112 may receive a signal indicative of the event from the event sensors 136. In response, the automated call system 112 may cause the embedded modems 116 to transmit multiple communications, such as a voice communication over a wireless voice service and a data communication over a wireless data service, offboard the vehicle 102 for the remote monitoring servers 110. Each of the remote monitoring servers 110 may be operated by a different remote monitoring service charged for servicing a different geographic area, and the communications transmitted offboard the vehicle 102 may be delivered to the remote monitoring service covering the current location of the vehicle 102 via the service's remote monitoring server 110. Responsive to receiving one of the communications, the remote monitoring service may dispatch help accordingly.

By sending multiple communications, the likeness of the remote monitoring servers 110 receiving a notification of the vehicle 102 event is improved relative to transmitting a single communication offboard the vehicle 102. Moreover, when the embedded modems 116 are configured to communicate via different cellular network providers and/or different communication services (e.g., voice service and data service), the likelihood that the remote monitoring servers 110 will receive the notification of the vehicle 102 event is further improved.

While an exemplary system 100 is shown in FIG. 1, the example is not intended to be limiting. Indeed, the system 100 may have more or fewer components, and alternative components and/or implementations may be used. For example, one or more of the vehicle 102 components may be combined into a single vehicle 102 component connected to the in-vehicle networks 128. As a further example, instead of or in addition to communicating via the in-vehicle networks 128, one or more of the vehicle 102 components may be directly connected. For instance, one or more of the vehicle 102 components may be directly connected to the HMI 120 to allow user interaction therewith.

Figure 3:
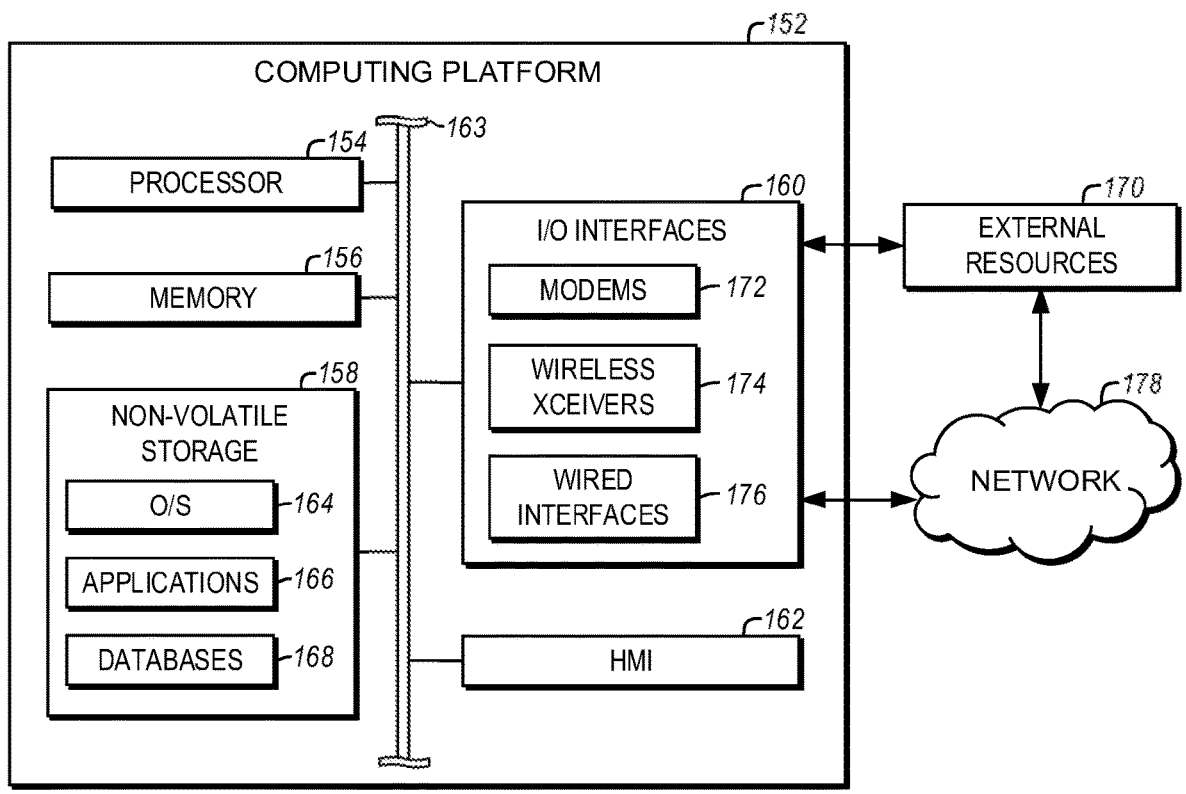
FIG. 3 is a schematic diagram of an exemplary computing platform that may be included in the system of FIG. 1.

Referring to FIG. 3, the vehicle 102 may include one or more computing platforms, such as the computing platform 152, for implementing the vehicle 102 components. For example, each vehicle 102 component may be implemented by a different computing platform 152 connected to the in-vehicle networks 128. Alternatively, multiple vehicle 102 components may be implemented by a same computing platform 152 connected to the in-vehicle networks 128. Each of the user device 104, the vehicle data servers 106, and the remote monitoring servers 110 may likewise include one or more computing platforms, such as the computing platform 152, for implementing the functions thereof.

A given computing platform 152 in the system 100 may include a processor 154, memory 156, non-volatile storage 158, input/output ("I/O") interfaces 160, and/or an HMI 162 in communication over one or more computer buses 163. The processor 154 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 156. The memory 156 may include a single memory device or a plurality of memory devices including, but not limited, random access memory ("RAM"), volatile memory, non-volatile memory, static random access memory ("SRAM"), dynamic random access memory ("DRAM"), flash memory, cache memory, or any other device capable of storing information. The non-volatile storage 158 may include persistent data storage devices such as a hard drive, optical drive, tape drive, non-volatile solid state device, or any other device capable of persistently storing information.

The processor 154 may operate under control of computer-executable instructions embodied as an operating system 164 residing in non-volatile storage 158 and read into memory 156. The operating system 164 may manage computer resources so that computer-executable instructions embodied as one or more software applications 166 residing in non-volatile storage 158 may be read into memory 156 and executed by the processor 154. Alternatively, the processor 154 may execute the applications 166 directly, in which case the O/S 164 may be omitted. The computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The HMI 162 may be operatively coupled to the processor 154 of computing platform 152 in a known manner to allow a user to interact directly with the computing platform 152. The HMI 162 may include any one or more of the components of HMI 120 (FIG. 1). For example, the HMI 162 may include video or alphanumeric displays, a touch screen, a speaker, and any other suitable audio and visual indicators capable of providing data to the user. The HMI 162 may also include input devices and controls such as an alphanumeric keyboard, a pointing device, keypads, pushbuttons, control knobs, microphones, etc., capable of accepting commands or input from the user and transmitting the entered input to the processor 154.

One or more databases 168 may reside on non-volatile storage 158, and may be used to collect and organize data used by the various systems and modules described herein. The databases 168 may include data and supporting data structures that store and organize the data. The databases 168 may be arranged with any database organization or structure including, but not limited to, a relational database, a hierarchical database, a network database, or combinations thereof. A database management system in the form of a computer software application executing as instructions on the processor 154 may be used to access the information or data stored in records of the databases 168 in response to a query, where a query may be dynamically determined and executed by the operating system 164, applications 166, or one or more modules.

Like the I/O interfaces 130 (FIG. 1), the I/O interfaces 160 may provide one or more machine interfaces that operatively couple the processor 154 to other devices and systems, such as the network 178 or one or more external resources 170. The network 178 may include the in-vehicle networks 128 and/or the network 150 (FIG. 1). External resources 170 may include, but are not limited to, servers, databases, mass storage devices, peripheral devices, cloud-based network services, or any other suitable computer resources that may be used by the computing platform 152. For example, the external resources 170 may include a vehicle 102 component implemented by a different computing platform 152 or another system 100 component. The applications 166 thus may work cooperatively with the network 178 or the external resources 170 by communicating via the I/O interfaces 160 to provide the various components, features, functions, applications, processes, or modules comprising embodiments of the invention.

The I/O interfaces 160 may include one or more embedded modems 172 (e.g., the embedded modems 116) that facilitate communication with other devices and systems over a cellular network; one or more wireless transceivers 174 (e.g., the wireless transceivers 132) for connecting and communicating with wireless transceivers of other devices and systems; and one or more wired interfaces 176 (e.g., the wired interfaces 134, a CAN interface) for connecting and communicating with wired interfaces of other devices and systems.

Figure 4:
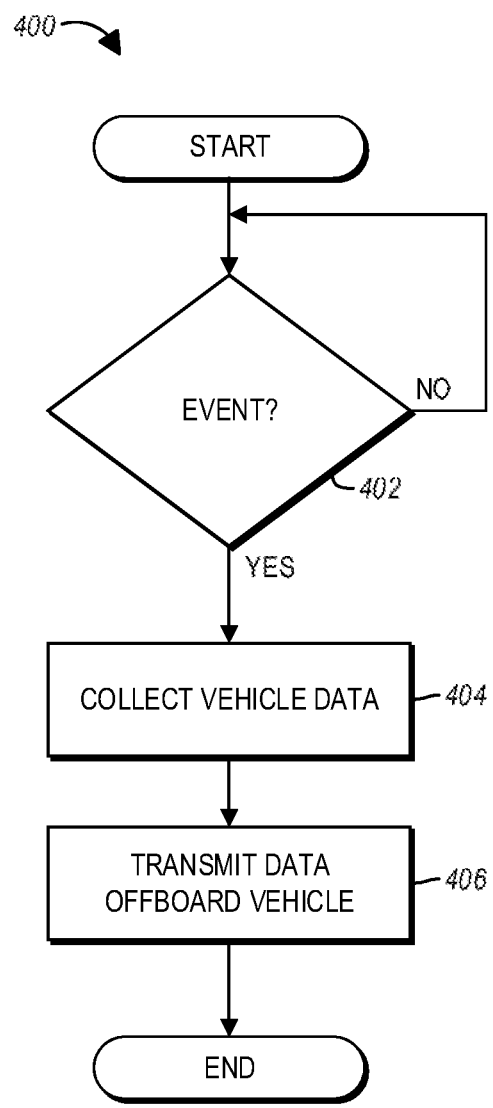
FIG. 4 is a flowchart of an exemplary process that may be performed by the system of FIG. 1.

FIG. 4 illustrates a process 400 that may be performed by the system 100 of FIG. 1. In block 402, occurrence of a predetermined event may be identified, such as by the automated call system 112. For example, the automated call system 112 may receive a signal indicative of the event from the event sensors 136. Responsive to receiving the indicative signal, the automated call system 112 may be configured to determine that the event has occurred ("Yes" branch of block 402).

In block 404, responsive to determining the occurrence of the predetermined event, vehicle 102 data may be collected, such as by the automated call system 112. The collected data may include a current vehicle 102 location. For example, the automated call system 112 may determine the vehicle 102 location by querying the GPS module 118.

The collected vehicle 102 data may also include an identifier of the type of predetermined event. The automated call system 112 may identify the type of predetermined event, such as an accident, vehicle 102 malfunction, security breach, or user-initiated emergency, based on the signal received from the event sensors 136. For example, the signal indicative of the event may include an identification of the event. Alternatively, the automated call system 112 may identify the event based on the event sensor 136 from which the event-indicating signal is received. For example, if the signal is received from an impact sensor, the automated call system 112 may identify the event as an accident. If the signal is received from an impact sensor located at the front of the vehicle, the automated call system 112 may identify the event as a front-end collision. If the signal is received from an impact sensor located atop the vehicle 102, the automated call system 112 may identify the event as a rollover accident. If the signal is received from an impact sensor located at the rear of the vehicle 102, the automated call system 112 may identify the event as a rear-end collision. If the signal is from an event sensor 136 related to a component of the vehicle 102 (e.g., the engine, a vehicle ECU 122), the automated call system 112 may identify the event as a malfunction of the component.

The collected vehicle 102 data may also include an identifier of the vehicle 102. The automated call system 112 may be configured to retrieve the identifier for the vehicle 102, such as the vehicle 102 VIN, from the non-volatile storage 158 for the automated call system 112.

In block 406, the collected vehicle 102 data may be transmitted offboard the vehicle 102 for the remote monitoring servers 110. The automated call system 112 may cause the embedded modems 116 to transmit the collected vehicle 102 data offboard the vehicle 102 via multiple communications from the embedded modems 116. For instance, the automated call system 112 may cause the embedded modems 116 to establish one more voice calls and one or more data calls for the transmission of the vehicle 102 data, and may cause the embedded modems 116 to transmit one or more text messages including the vehicle 102 data. In this way, the chances that the remote monitoring servers 110 will receive the data is improved relative to a single communication.

One or more of the communications may be in the form of a voice call. Specifically, the automated call system 112 may cause one or more of the embedded modems 116, such as the TCU modem 124, to establish a voice call in which the collected vehicle 102 data is transmitted offboard the vehicle 102. A voice call may be established over a wireless voice service or, alternatively, over a wireless data service via a voice over data protocol (e.g., Voice Over Internet Protocol, Voice Over LTE). Each voice call may be between one of the embedded modems 116 and the remote monitoring servers 110. For example, the automated call system 112 may cause one of the embedded modems 116 to establish a voice call by causing the embedded modem 116 to dial a predetermined number, such as "911." Thereafter, the cellular network provider for the embedded modem 116 and/or the network 150 may automatically route the voice call to the remote monitoring server 110 of the remote monitoring service covering the vehicle 102 location. The automated call system 112 may then cause the embedded modem 116 to transmit the collected vehicle 102 data as a sequence of tones, such as dual-tone multi-frequency ("DTMF") tones, over the voice call. The remote monitoring server 110 may then interpret the tones into the collected vehicle 102 data, so that the remote monitoring service can dispatch help accordingly.

In addition, or alternatively, one or more of the communications may be in the form of a data call. Specifically, the automated call system 112 may cause one or more of the embedded modems 116, such as the AV modem 126, to establish a data call in which the collected vehicle 102 data is transmitted offboard the vehicle 102. An embedded modem 116 may establish a data call over a wireless data service to which the embedded modem 116 is subscribed. Each data call may be between one of the embedded modems 116 and the remote monitoring servers 110, or alternatively, between one of the embedded modems 116 and vehicle data servers 106. The automated call system 112 may cause an embedded modem 116 to establish a data call by causing the embedded modem 116 to open a connection with its wireless data service, establish a TCP/IP session, and transmit packets including the collected vehicle 102 data over the wireless data service. The packets may be addressed to the remote monitoring servers 110 or, alternatively, to the vehicle data servers 106. In the latter case, the vehicle data servers 106 may be configured to, responsive to receiving the packets, identify and transmit the collected vehicle 102 data to the remote monitoring server 110 of the remote monitoring service covering the vehicle 102 location contained in the data. The remote monitoring service may then dispatch help accordingly.

In addition, or alternatively, one or more of the communications may in the form of a text message. Specifically, the automated call system 112 may cause one or more of the embedded modems 116, such as the TCU modem 124, to transmit a text message including the collected vehicle 102 data. Because less signal strength is needed for sending a text message relative to establishing a voice call and a data call, sending a text message along with at least one of the voice call or the data call may further improve the likelihood that the collected vehicle 102 will be received by the remote monitoring servers 110.

In some embodiments, the automated call system 112 may cause one or more of the embedded modems 116 to send the text message to an emergency number, such as "911", in which case the cellular network provider for the embedded modem 116 and/or the network 150 may automatically route the voice call to the remote monitoring server 110 of the remote monitoring service covering the vehicle 102 location. Additionally, or alternatively, the automated call system 112 may cause one or more of the embedded modems 116 to transmit the text message over the network 150 to the vehicle data servers 106, may be configured to, responsive to receiving the text message, identify and transmit the collected vehicle 102 data to the remote monitoring server 110 of the remote monitoring service covering the vehicle 102 location contained in the data.

In some embodiments, the automated call system 112 may be configured to cause one embedded modem 116 to send out two or more communications. For instance, one of the embedded modems 116, such as the TCU modem 124, may be configured for both wireless voice service and wireless data service, and the automated call system 112 may be configured to cause this embedded modem 116 to establish two voice calls (e.g., one over wireless voice service and one over wireless data service), or a data call and a voice call, in response to a predetermined event. As another example, one of the embedded modems 116, such as the TCU modem 124, may be configured transmit multiple text messages including the collected vehicle 102 data, one text to the remote monitoring servers 110, and the other text to the vehicle data servers 106. This action may be in addition to causing other embedded modems 116 to establish a data call and/or voice call, and/or send a text message, in response to the event. The automated call system 112 may also be configured to cause two embedded modems 116 to transmit the collected vehicle 102 data via a same type of communication (e.g., voice call, data call, text message), such as when the embedded modems 116 are subscribed to different cellular networks.

The utilization of different communication types, and/or that each embedded modem 116 is configured with a different network provider, increases the chance that data will be successfully communicated from the vehicle 102 to the remote monitoring servers 110.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for a vehicle comprising:
   an embedded first modem;
   an embedded second modem;
   a vehicle location controller; and
   a processor configured to, responsive to occurrence of a predetermined event,
   collect a vehicle location from the vehicle location controller;
   wirelessly transmit the vehicle location offboard the vehicle via a voice call established by the first modem, and
   wirelessly transmit the vehicle location to the server via a data call established by the second modem to a remote monitoring service, the data call being established independent of establishment of the voice call, wherein the first modem is configured for a first cellular network, and the second modem is configured for a second cellular network that differs from the first cellular network, and the data call and the voice call occur contemporaneously.

2. The system of claim 1, wherein the predetermined event is an airbag deployment.

3. The system of claim 1, wherein the voice call is between the vehicle and the remote monitoring service.

4. The system of claim 1, wherein the data call is between the vehicle and a server geographically remote from the remote monitoring service, and the server is configured to, responsive to receiving the vehicle location, transmit the vehicle location to the remote monitoring service.

5. The system of claim 1, wherein the processor is further configured to, responsive to occurrence of the predetermined event, transmit a vehicle identifier and an event identifier via the voice call and via the data call.

6. The system of claim 1, wherein the first modem is configured to wirelessly receive and process remote control commands for the vehicle, and the second modem is configured to wirelessly receive and process software updates for the vehicle.

7. The system of claim 1, wherein the first modem is configured for a wireless voice service, and the second modem is configured for a wireless data service and not a wireless voice service.

8. The system of claim 7, wherein the first modem is configured for a wireless data service.

9. The system of claim 1, wherein the processor is configured to wirelessly transmit the vehicle location via the voice call by wirelessly transmitting a plurality of dual-tone multi-frequency tones via the voice call.

10. The system of claim 1, wherein the processor is further configured to, responsive to occurrence of the predetermined event, wirelessly transmit the vehicle location offboard the vehicle for the remote monitoring service via a text message sent by the first modem.

11. A vehicle, comprising:
a first embedded modem configured to receive remote control commands for the vehicle;
a second embedded modem configured to receive software updates for the vehicle;
a vehicle location controller configured to calculate a vehicle location; and
a processor configured to, responsive to occurrence of a predetermined event,
collect the vehicle location from the vehicle location controller,
wirelessly transmit the vehicle location offboard the vehicle via a voice call established by the first embedded modem, and
wirelessly transmit the vehicle location offboard the vehicle via a data call established by the second embedded modem for a remote monitoring service, the data call being established independent of establishment of the voice call,
wherein the first modem is configured for a first cellular network, and the second modem is configured for a second cellular network that differs from the first cellular network, and the data call and the voice call occur contemporaneously.

12. The vehicle of claim 11, wherein the processor is configured to, responsive to the predetermined event, cause the first embedded modem to establish a voice call with the remote monitoring service for the transmission of the vehicle location.

13. The vehicle of claim 11, wherein the processor is configured to, responsive to the predetermined event, cause the second embedded modem to establish a data call with a server geographically remote from the remote monitoring service for the transmission of the vehicle location, and the server is configured to, responsive to receiving the vehicle location, identify the remote monitoring service from a plurality of remote monitoring services based on the vehicle location, and transmit the vehicle location to the remote monitoring service.

14. The vehicle of claim 11, wherein the processor is further configured to, responsive to occurrence of the predetermined event, wirelessly transmit the vehicle location offboard the vehicle for the remote monitoring service via a text message sent by the first modem.

15. A method comprising:
by a vehicle, responsive to occurrence of a predetermined event,
wirelessly transmitting a vehicle location offboard the vehicle via a first text message using a first modem to a remote monitoring service, and
wirelessly transmitting the vehicle location offboard the vehicle via a second text message using a second modem to a server geographically remote from the remote monitoring service, the first text message being sent out independent of the transmission of the second message, and the first text message and the second text message being sent out contemporaneously.

16. The method of claim 15, wherein the first text message and the second text message are sent by a first embedded modem of the vehicle, and further comprising, responsive to occurrence of the predetermined event, wirelessly transmitting the vehicle location offboard the vehicle via a voice call established by the first modem.

17. The method of claim 16, further comprising, responsive to occurrence of the predetermined event, wirelessly transmitting the vehicle location offboard the vehicle via a data call established by a second modem of the vehicle.

18. The method of claim 17, wherein the first modem is configured for a first cellular network, and the second modem is configured for a second cellular network that differs from the first cellular network.

* * * * *